Jan. 18, 1966     H. H. McLELAND     3,229,984
MATERIAL UNLOADING DEVICE
Filed Nov. 20, 1963     4 Sheets-Sheet 3
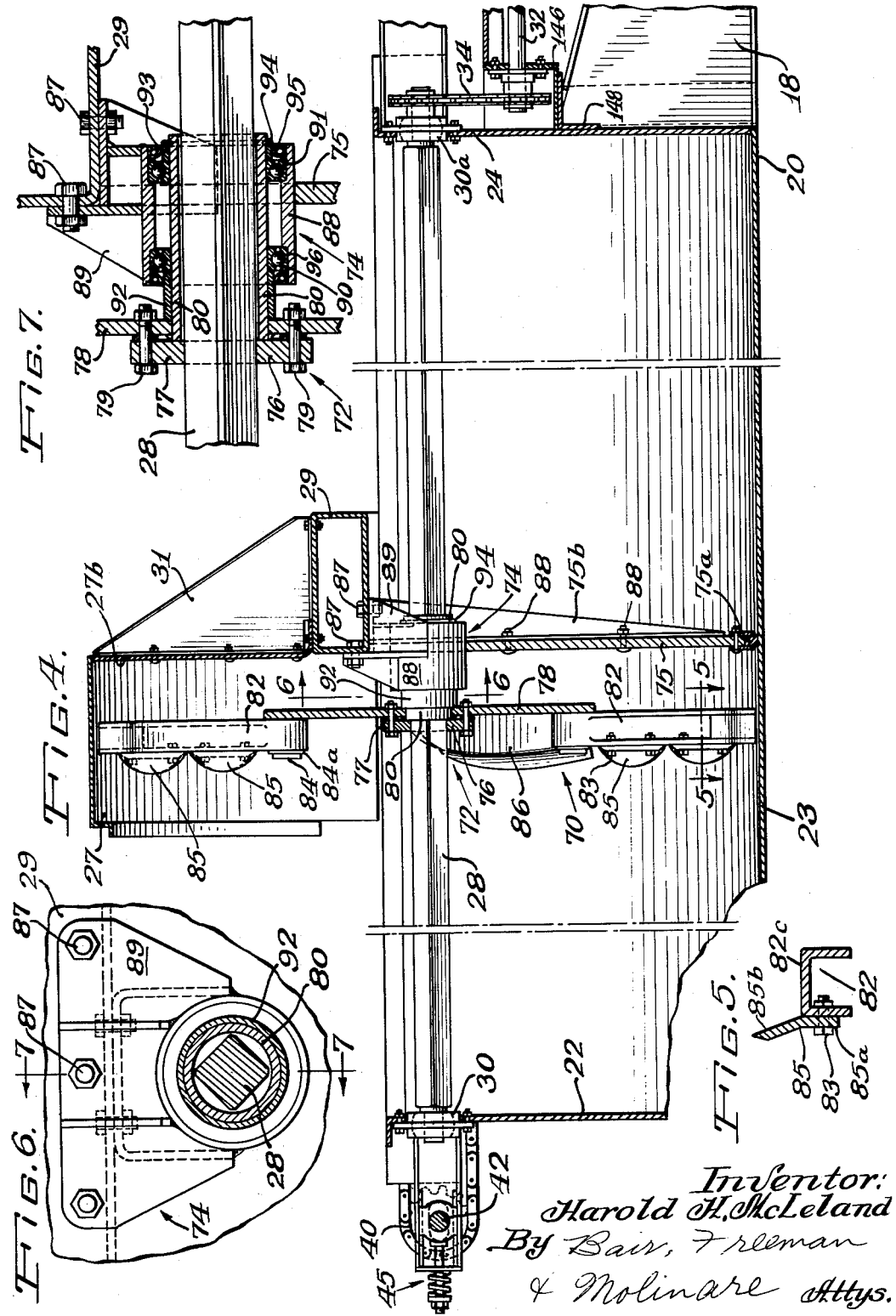
Inventor:
Harold H. McLeland
By Bair, Freeman
& Molinare Attys.

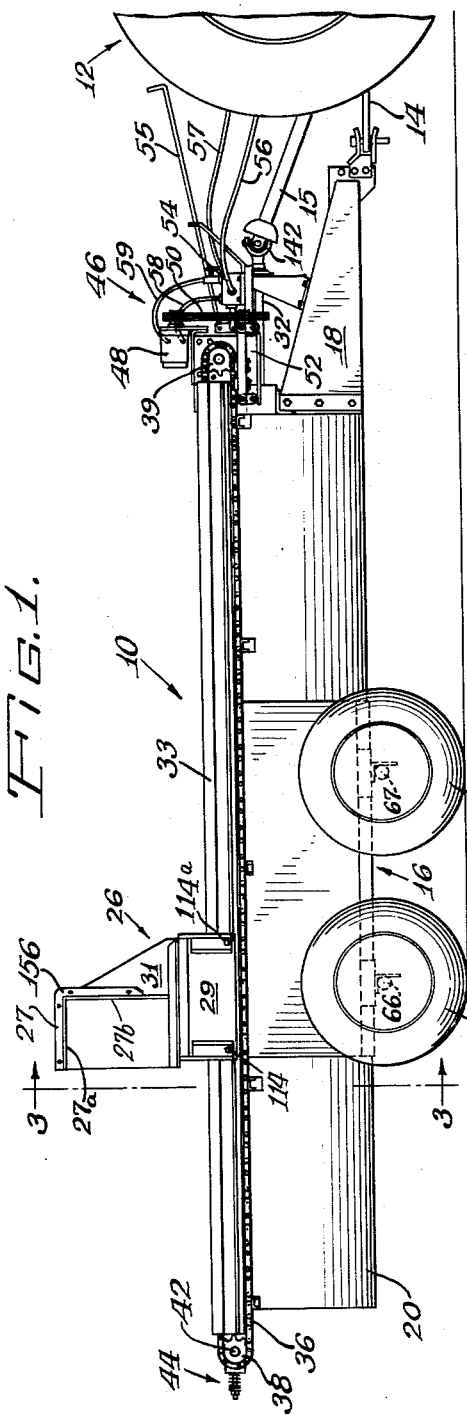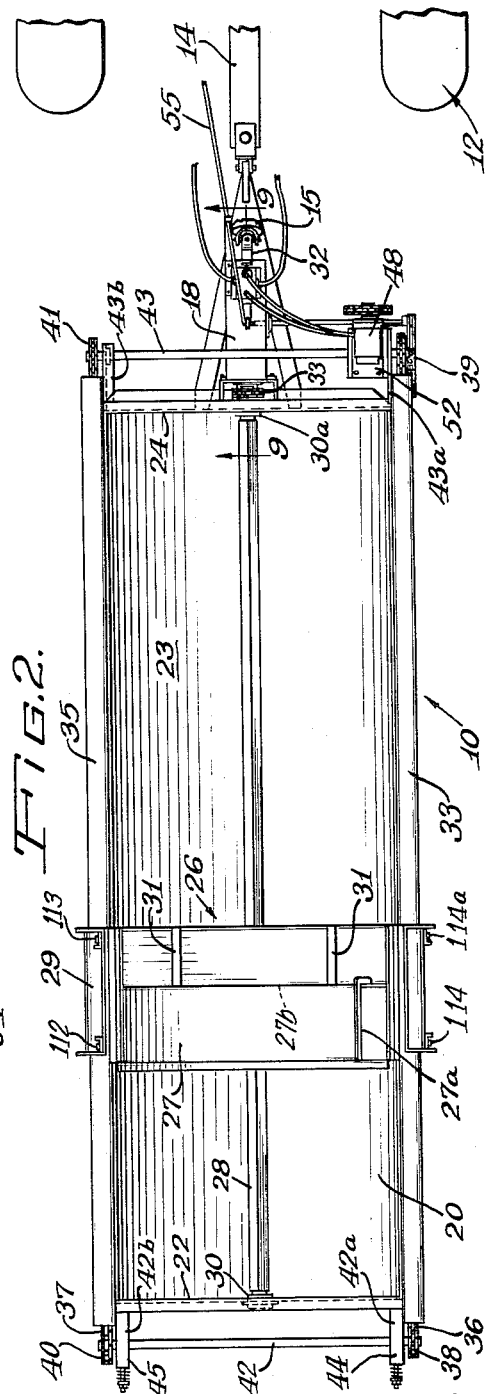

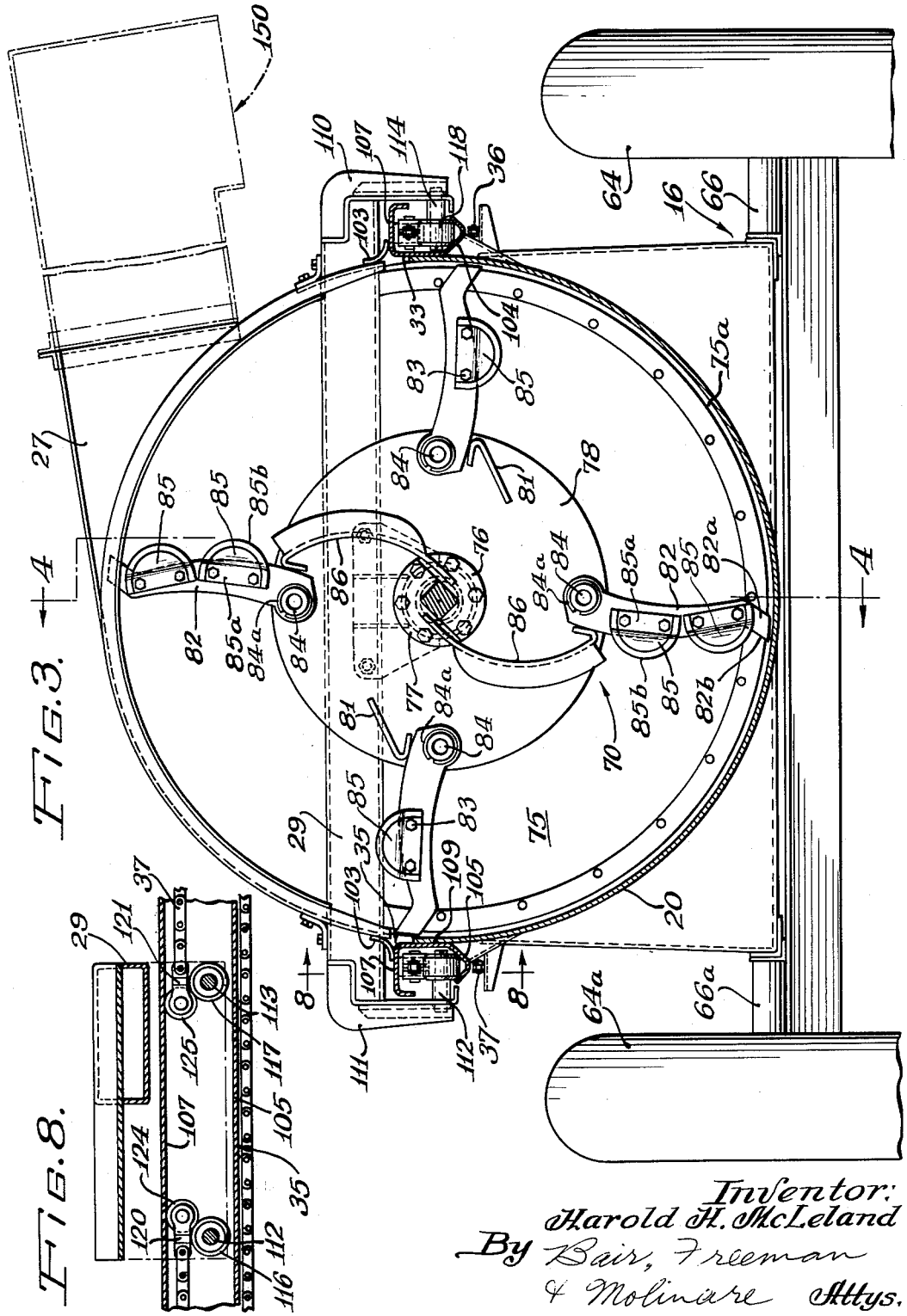

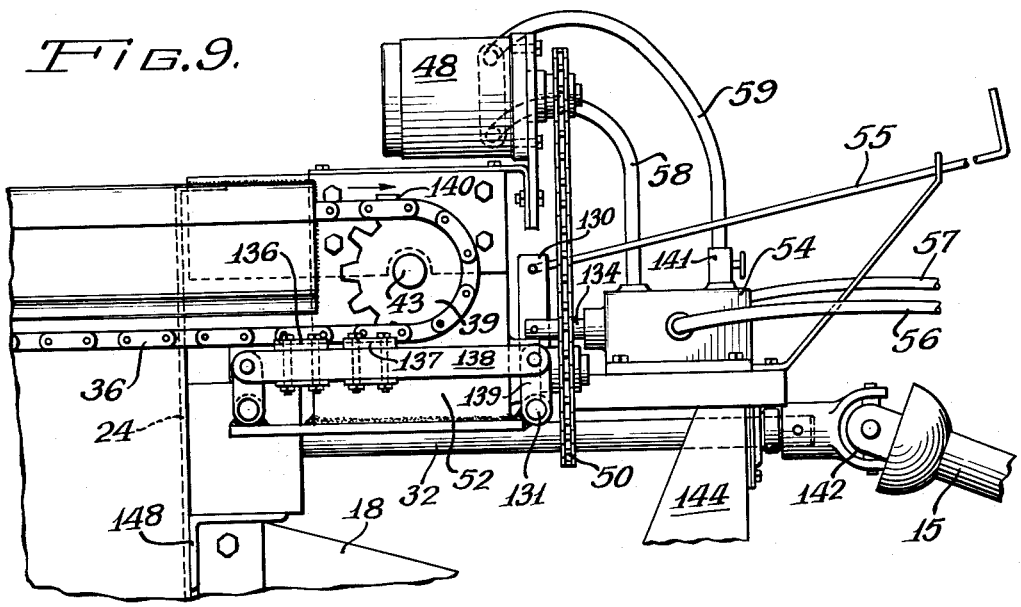
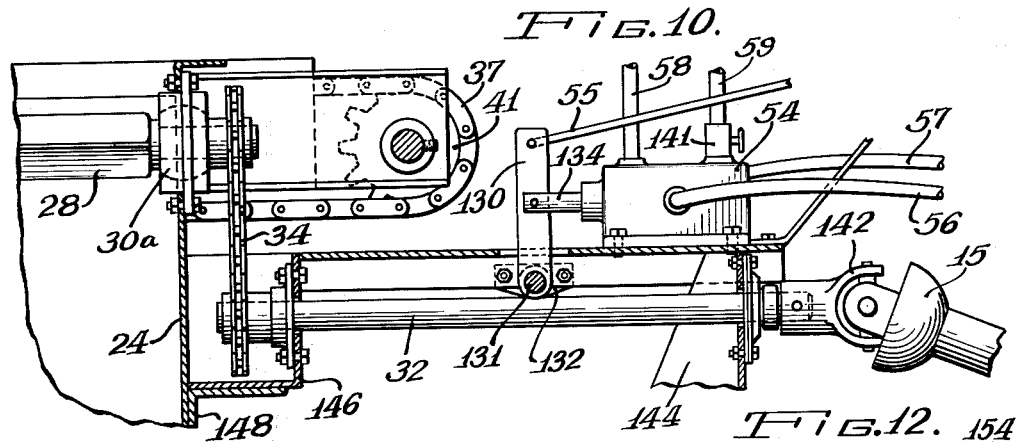
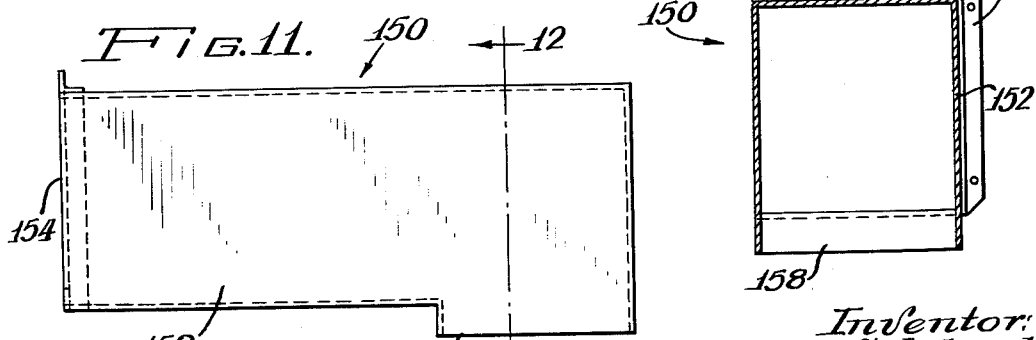

United States Patent Office 3,229,984
Patented Jan. 18, 1966

3,229,984
MATERIAL UNLOADING DEVICE
Harold H. McLeland, Cedar Falls, Iowa, assignor to L. H. Schultz Manufacturing Company, a corporation of Illinois
Filed Nov. 20, 1963, Ser. No. 324,944
14 Claims. (Cl. 275—3)

This invention relates to a material unloading device and, more particularly, relates to a centrifugal impeller-type material unloading device that is arranged to move into the mass of material that is to be unloaded, and by means of which a combination aerodynamic and centrifugal discharge action is achieved which results in effective and desirable discharge of materials of varying character.

Still more particularly, this invention relates to an improved spreader for materials such as manures and fertilizers which may be of widely varying solid and liquid consistencies.

Early material unloading devices for unloading manures frequently includes a box-type body having a chain-type apron or slat-type conveyor movable over the bottom thereof for feeding manure or other material rearwardly to a rear mounted beater or distributor means. The conveyor means operating in the manure being handled were subject to damage by the acids and/or alkalis in such materials. Some manures contain substantial amino acids, salts, and other substances that were not digested by livestock, so as to cause destructive deterioration of apron chains or other conveyor means within a few months of operation. Sometimes the material is fed from the beater means to a widespread member for effecting better distribution of the material onto the field being treated. In such prior constructions, considerable expense is involved in fabricating and maintaining such elements as the apron, apron chains, beater, widespread and their drive mechanism.

Another deficiency common in such earlier constructions is that the device could not distribute the material being unloaded evenly over the field. The distribution pattern was not uniform. Frequently, large clods of material were discharged onto the field, resulting in subsequent burning or scorching of the ground.

Such conventional spreaders, and particularly manure spreaders, had a container adapted to properly contain only dried material such as a powdered fertilizer or fibrous-type matter, and were almost totally incapable of containing liquids, as for example, manures in liquefied condition.

Another type of material unloading device usable for distributing manures is known which includes a wheel-mounted, elongated material container of semicylindrical cross section and which contains therein an axially extending rotatable shaft carrying a plurality of chains or flexible flail arms spaced along the length thereof. In operation, as the shaft rotates, the flail arms unwind and straighten out under centrifugal force, and act upon the material in the container to pulverize same and to discharge the material laterally of the spreader. As the load in the container diminishes, the flail arms continue unwinding until the unloading device is emptied.

One disadvantage of this flail-type material unloading device is that a consistent, even pattern of material discharge cannot be maintained from the start of unloading to the completion of unloading, with all types of material. Another disadvantage of the flail-type device is that due to the number of flail arms affixed to and axially spaced along the shaft, a large initial load is imposed upon the rotatable shaft in the container, upon the power takeoff used for driving said rotatable shaft, and upon the flail arms. The flail arms frequently break or are wrenched from the rotatable shaft due to the heavy loading thereon. Furthermore, such devices have utility limited to materials of a particular character, namely solids, and cannot be used effectively in distributing materials of a different character, such as liquid manures.

Thus, an important object of the present invention is to provide an improved material unloading device which will spread or distribute materials of all types (including dry pelletized or bulk fertilizer; dry pesticide or insecticide; any type of manure from frozen chunks to liquid; grain; green, wet or dry forage; corn cobs; snow and ice; and baled material, such as straw) substantially uniformly and evenly from the start of the unloading operation to the completion of the unloading operation.

Another object of the present invention is to provide a material unloading device with unloading means which moves endwise into a load of material to be unloaded so that if the load is of solid materials, the unloading means operates both to cut material from an end of the load and to thereafter scatter the cut or disintegrated material over the field.

A further object of the present invention is to provide a material unloading device with unloading means that is moved axially against the load remaining to be unloaded, so as to provide for substantially uniform power requirements during an unloading operation, thereby avoiding overloading of the unloading means and providing for substantially uniform discharge characteristics for the device.

It is still another object of the present invention to provide a material unloading device having an action chamber into which material that is to be discharged is caused to enter and to be acted upon by centrifugal impeller means that operates both to create an aerodynamic condition and a directed impelling condition which effects control over the direction, distance, and pattern of distribution of the material discharged from the unloading device.

It is still another object of the present invention to provide a material unloading device with movable unloader means that includes partial casing means for an impeller which are caused to cooperate with a load within the material unloading device to define an impeller action chamber wherein material is first cut from the face to the load by an impeller on the unloader means and is then hurled by the impeller from the action chamber and scattered over the field in a uniform pattern of distribution.

Yet another object of this invention is to provide a material unloading device having a novel centrifugal-type impeller means movable within a container and driven by conveyor mechanism disposed exteriorly of the container and therefore not subject to destructive deterioration from the contents of the container.

Yet another object of the present invention is to provide a relatively maintenance-free material unloading device having a novel impeller-type unloading mechanism which is reliable in operation in all kinds of weather and even at temperatures below freezing.

A still further object of the present invention is to provide a material unloading device having an unusually low profile so that it may readily be utilized under barn cleaner elevators.

A further object of this invention is to provide an improved material unloading device that utilizes centrifugal impeller action that is particularly adaptable to accommodate attachments for filling feed bunks with various kinds of forage, grain or feed.

Further objects and advantages of this invention will become apparent as the following description proceeds, and the features of novelty which characterize this invention will be pointed out with particularity in the claims annexed to and forming a part of this specification.

A preferred embodiment of the invention is shown in the accompanying drawing, wherein like numerals refer to like elements, and in which:

FIGURE 1 is a side elevation of a material unloading device embodying the present invention, and showing a portion of the tractor assembly commonly utilized to propel the material unloading device over a field;

FIGURE 2 is a plan view of the material unloading device;

FIGURE 3 is a cross-sectional view of the material unloading device taken generally along the line 3—3 of FIGURE 1, and illustrating in dotted line an attachment which is utilized for filling a feed bunk;

FIGURE 4 is a longitudinal cross-sectional view of the material unloading device, with parts broken away, taken generally along the line 4—4 of FIGURE 3;

FIGURE 5 is a detail view of an impeller arm member taken generally along the line 5—5 of FIGURE 4;

FIGURE 6 is a detail view of the unloading means taken generally along the line 6—6 of FIGURE 4 and illustrating the relationship between the journal means carried on the unloading means and the elongated, longitudinally disposed rotatable shaft supported within the container of the material unloading device;

FIGURE 7 is a detail cross-sectional view taken generally along the line 7—7 of FIGURE 6 and illustrating the operative association between the rotatable shaft, the hub means for rotating the impeller arm members, and the journal means for supporting the hub means for longitudinal movement along the rotatable shaft;

FIGURE 8 is a detail cross-sectional view on an enlarged scale taken generally along the line 8—8 of FIGURE 3 and illustrating the trolley rollers of the mechanism for actuating the unloading means from one end of the material unloading device to the other end of the material unloading device;

FIGURE 9 is an enlarged detail view of a portion of the conveyor drive mechanism for moving the unloader means within the container;

FIGURE 10 is a cross-sectional view taken generally along the line 10—10 of FIGURE 2 and better illustrating the detail of the drive mechanism for the rotatable shaft within the container;

FIGURE 11 is a side view of an attachment adapted to be connected to the shroud of the material unloading device for permitting the filling of feed bunks; and FIGURE 12 is a cross-sectional view taken generally along the line of 12—12 of FIGURE 11 of the attachment for filling feed bunks.

Referring to the drawings, there is illustrated in FIGURE 1 a material unloading device 10 embodying the present invention, such device being adapted to be drawn by a conventional tractor 12. The tractor 12 is provided with a drawbar 14 attached to the frame of the tractor in the usual manner and a power takeoff shaft 15 extending rearwardly from the tractor and adapted to supply power to the material unloading device 10. The tractor 12 is further provided with a hydraulic system which is adapted to be connected to a power system on the material unloading device.

The material unloading device 10, which may be of the type commonly referred to as a manure spreader, includes an elongated main frame 16 carrying an elongated generally U-shaped or semicylindrical body member 20 which is adapted to contain the material to be spread upon a field. The top of the container 20 is open to facilitate loading of the container. It is preferred that the body member or container 20 be liquid-tight so that it will be capable of holding all types of material including solid, liquid, and slurry material. Examples of matter which can be spread by the present invention are any type of manure, powdered fertilizer, dry pesticide or insecticide, forage, baled material, as for example, straw, and grain. The body member 20, which is preferably a monocoque or self-supporting structure, is comprised of end walls 22 and 24 interconnected by a bottom wall 23. Affixed at the front of the container 20 is a draft member 18 adapted to be connected to the drawbar 14 of the tractor 12.

Movable longitudinally within the container 20 from a position adjacent one end of container 20 to a position adjacent the other end is a material unloader 26 which comprises a shroud 27 affixed to a cross member 29 by support means including braces 31. Within the shroud or cover 27 of material unloader 26 are rotatable cutting and spreading members adapted to be driven from the elongated rotatable shaft 28 supported at each end in the walls 22 and 24 of container 20 by bearings 30 and 30a. Rotative power is supplied to the shaft 28 from the power takeoff shaft 15 via a stud shaft 32 affixed to container 20 and a chain and sprocket drive 34 operatively connected between shaft 32 and shaft 28.

The cross member 29 is movable along longitudinally extending rails or tracks 33, 35 by conveyor mechanism for moving unloader means 26 back and forth within the container 20. The conveyor mechanism comprises a pair of chains 36 and 37 operatively connected to the cross member 29 of the material unloader in a manner more fully set forth hereafter. The chains 36 and 37, respectively, are trained over the sprockets 38, 39 and 40, 41, respectively. Sprockets 38 and 40 are secured to cross shaft 42 journaled in brackets 42a and 42b at the rear of the body member 20. Sprockets 39 and 41 are affixed to cross shaft 43 journaled in brackets 43a and 43b at the front of body member 20. Adjustment means 44 and 45 are provided at the rear of the container 20 for properly tensioning the chains 36 and 37, respectively.

The drive mechanism 46 for actuating the conveyor chains 36 and 37 includes a hydraulic motor 48 operatively connected by means of a chain and sprocket drive 50 to a worm gear reduction mechanism 52. Mechanism 52 is in turn connected to the cross shaft 43 for driving the conveyor chains.

The control means for actuating the hydraulic motor includes a four-way valve mechanism 54 actuable by a control handle 55 from a remote position on tractor 12. The four-way valve 54 is operatively connected via lines 56 and 57 to the hydraulic system of the tractor by means of suitable, quick disconnect hydraulic fittings (not shown.) Lines 58 and 59 operatively connect hydraulic motor 48 to valve 54.

The container 20 is supported on frame 16 for movement over the ground by tandem support wheels 64 and 65 which are rotatably mounted upon axles 66 and 67 suitably affixed to the main frame 16 of material unloading device 10.

Referring now to FIGURES 3, 4, 5, 6 and 7, there is better illustrated the material unloader 26. Such unloader or impeller means preferably comprises an impeller or spreader 70 affixed to a hub assembly 72 for rotation with shaft 28 and a collar assembly 74 journaling the hub assembly 72 and affixed to brace board 75 and cross arm 29 for longitudinal movement within the container 20 in response to actuation of the conveyor mechanism. The top of impeller 70 is enclosed by shroud 27 carried on cross arm 29. The shroud 27, which may be fabricated from sheet metal, includes a wall 27b. The brace board 75, which may be made from plywood suitably reinforced and strengthened by supports 75b, generally conforms in shape to the inside of body or tank 20. Sealing means 75a made from rubber, neoprene, plastic or like material is provided on the peripheral edge of the board 75 between the board and the interior surface of the body 20.

Defined between the face of the material to be unloaded, the follow board 75, the interior surface of the body 20 and the shroud 27 is an action chamber. The impeller rotates within such chamber to shear or cut the face of the load in body 20 and to fling the cut and/or disintegrated mass from the body 20 through the opening 27a in shroud 27. The rapidly rotating impeller creates sufficient windage and aerodynamic effect within the action chamber to effectively assist in the propulsion of the mass from body 20 and to provide a wider distribution of material upon the field then would be possible if distribution were dependent solely upon flinging of material from the impeller. As aforenoted, the impeller or unloader means 26 is movable longitudinally within body 20. Accordingly, the action chamber will be moved progressively from one end of the container to the other to completely unload the material from the container 20.

The board or support 75 also functions to provide backing for slurry, grain, or like material that has a high angle of repose, so that the impeller means can be stopped at any position in the container and be restarted without recycling the unloader means 26. The shaft 28 is noncircular in cross section and preferably is polygonal. In the illustrated embodiment of this invention the shaft is square.

The hub assembly comprises a split hub including sections 76 and 77 which define an opening complementary to the cross section of shaft 28. The sections 76 and 77 are detachably affixed to backing plate 78 by means of bolt and nut fastening means 79. Thus, in the event of excess wear or breakage, the sections 76 and 77 can be replaced without disturbing other components. The backing plate or impeller plate is rigidly connected to cylindrical sleeve 80, as for example, by welding. Sleeve 80 is adapted to be moved longitudinally along shaft 28.

The novel impeller, best seen in FIGURES 3, 4 and 5, comprises swingable elongated arm elements 82 pivotally affixed to heavy hinge pins 84 carried on backing plate 78. Retainer rings 84a are provided to maintain arms 82 on pins 84. Stops 81 may be provided on the backing plate 78 adjacent to the inner ends of arms 82 to limit the swing of the arms.

In a presently preferred form of the invention, four rigid, channel-like arms 82 are pivotally supported on the backing plate. One pair of oppositely disposed arms each carry two semicyclindrical blades 85. The other pair of arms 82 each carry only one knife or blade 85 on a centerline between the two blades on an adjacent arm. This construction maximizes the shearing or cutting of material from the face of the load. The blades 85 are detachably affixed on arms 82 by means of suitable fastening means, as for example, bolts or machine screws 83.

Each cutting blade or knife 85 comprises a first generally planar support portion 85a adapted to be affixed to a swingable arm 82 and a second planar portion 85b extending from the portion 85a at an angle thereto. Portion 85b is substantially semicylindrical in plan view. The outer edge of portion 85b of each blade is heat treated and hardened. The angled portion 85b extends at an angle of approximately 20 degrees from the plane of the portion 85a of a blade 85. It is noted that the portion 85a of blade 85 lies in a plane substantially parallel to the plane of an arm 82.

The top or leading surface 82c of each arm 82 is relatively wide for assisting in the discharge or flinging of material from the container 20. The end 82a of each arm 82 may be weighted, as for example, by affixing a separate weight to the end of each arm 82. Further, it is noted that the end 82a of each arm 82 has a reverse curvature along the leading edge as indicated at 82b, that is, the end of the arm is curved forwardly in the direction of rotation of the impeller, whereas the forward face or leading surface of each arm 82 is curved in a convex manner with respect to the normal direction of rotation of the impeller. This arm tip curvature has been found to materially increase the velocity of the material flung from the arms.

Also provided on the backing plate 78 are a pair of self-cleaning auger-type blades or spirally-acting cutters 86 which function to cut into the load centrally of the face thereof to facilitate initial breakup of hard or compacted material, as for example, frozen manure. The blades 86 will move material radially and outwardly from the center of the load in container 20 onto the widened leading face 82c of arms 82. The arm 82 will then hurl the material through opening 27a in shroud 27. Blades 86 also function to clean material, such as straw, which has a tendency to wind upon shaft 28, from the exterior surface of shaft 28.

At the beginning of the unloading operation, the arm elements or impellers will nest around the circumference of the hub assembly 72 of the impeller member, thereby providing a minimum torque upon the rotatable shaft 28 and the power takeoff shaft 15 suitably connected to the rotatable shaft and supplying the driving power thereto. With the rotation of shaft 28, blades 86 will cut into the center of the load and begin to disintegrate the mass and move it radially outwardly along the blades 86. As the shaft speed increases, the semicircular blades 85 shear and cut through the material and the arms 82 carrying the blades are pivoted outwardly from the backing plate 78 by centrifugal force. The free ends of arms 82 assume positions remote from the periphery of the plate 78, with the arms lying generally in radial lines extending through the axis of the hinge pins 84. By virtue of the lead angle of the face of the semicircular blades 85, there is a definite shearing action as the material unloader or impeller progresses through the container. Cut material falls upon the leading surface 82c of arms 82 and is flung from the arms through the opening 27a in shroud 27. The pressure produced in the action chamber defined between the face of the load, follow board 75, the bottom of container 20, and the shroud 27 assists in the discharge and scattering of materials from container 20. The rapidly moving air passing from shroud 27 carries the material and effects a wide distribution thereof over the side of the container in a direction generally transverse to the direction of travel.

The collar assembly 74 includes a sleeve 88 connected to cross arm 29 by angle members 89 and fastening means 87. Within sleeve 88 are bearings 90 and 91 for journaling the sleeve 80. A spacer 92 is provided between the plate 78 and the bearing 90. A similar spacer 93 is provided between the bearing 91 and the retaining ring 94. The retaining ring 94 functions to operatively affix the hub assembly to the collar assembly. Suitable seals 95 and 96 may be provided to prevent leakage of lubricant from the bearings 90 and 91.

Considering FIGURES 3 and 8, there is shown the connection of the unloader device or impeller 26 to the drive chains 36 and 37 of the conveyor mechanism. As the tracks 33 and 35 are the same, except for being disposed on opposite sides of container 20, the following description will relate to the left-hand track 35 as viewed in FIGURE 3. It will be understood that the track 33 cooperates with the right-hand side of the cross arm in the same manner as the track 35 cooperates with the left-hand side of the cross arm member 29.

Track or guide 35 comprises an upwardly facing generally V-shaped portion 105 and a downwardly facing angle portion 107 interconnected by a generally vertically disposed wall member 109. Extending from the depending arm portion 111 of cross arm 29 are axles or stud pins 112 and 113. Rotatably supported on these axles 112 and 113 are rollers 116 and 117, respectively. The rollers 116 and 117 function to carry the cross arm 29 in the lower portion 105 of track 35. Similar rollers including rollers 118 and 118a on axles 114 and 114a carry the right-hand side of cross arm 29 in the track 33 (FIGURE 3) through depending arm portion 110.

The ends of chain 37 are affixed to lever arms 120 and 121 which carry floating rollers 124 and 125, respectively. The rollers 124 and 125 are journaled on the lever arms 120 and 121 and rotate in the opposite direction from rollers 116 and 117. Initially, the chain tightener 45 is adjusted in such manner that the rollers 124 and 125 bear upon the top portion 107 of track 35. Chain tightener 44 is similarly adjusted so that the floating rollers on the right side of the unloading device bear upon the upper portion 108 of track 33. In operation, the floating rollers at each side of the cross arm are wedged against the tops of tracks 33 and 35 to assure that the cross arm 29 remains operatively engaged with chains 36 and 37. The conveyor mechanism will remain operatively engaged with the impeller means 26 at all times. This construction compensates for minor deviations in either track 33 or 35 and minimizes rattling of the rollers in the tracks even when the device 10 moves over rough terrain. In a presently preferred form of the invention, the angle between a plane passing through the rotational axis of the carrier rollers and a plane passing through the rotational axis of a carrier roller and its associated free floating roller is on the order of 20 to 45 degrees. The impeller means are carried by cross arm 29 on tracks 33 and 35. Shaft 28 does not support the impeller means but is operatively connected to impeller 70 to provide a rotative drive therefor.

Preferably, a sealing strip 103 is affixed to each side of the shroud for closing the opening between the shroud and the top of the tracks 33 and 35.

Referring now to FIGURE 9, there is shown the drive mechanism for the conveyor for moving the impeller means 26 within the container 20. The control handle 55 is affixed at the rear thereof to lever 130 carried on a cross shaft 131 pivoted in bracket 132 (FIGURE 10) which is affixed to the main frame 16. The rod 134 is connected to lever 130 and is moved thereby to actuate the control valve 54. At the same time that rod 134 is moved, stops 136 and 137 carried on arm 138 are positioned for engagement with a lug 140 affixed to the chain 36. At startup, the control valve will be in its neutral position. When the control handle 55 is actuated, the control valve will be moved from neutral position to a first position permitting the flow of fluid to the hydraulic motor 48 and effecting driving of the chains 36 and 37 through the gear reduction mechanism 52. Actuation of the conveyor mechanism results in movement of the impeller from the front to the rear of the manure spreader. It will be understood that as the impeller approaches the rear of the container 20, lug 140 will strike the stop 136 causing appropriate actuation of control valve 54 via linkage comprising arm 138, short lever 139, cross shaft 131, lever 130, and rod 134. The direction of drive of the hydraulic motor 48 is reversed. The gear drive mechanism 52 is driven in a reverse direction and the unloader 26 moves in an opposite direction toward the front of the container 20. As the unloader 26 reaches the front, lug 140 on the chain 36 will strike the stop 137 and cause actuation of the control valve 54, returning the control valve to neutral position and terminating operation of the conveyor. The rate of movement of the conveyor chains may be regulated by means of a rate control valve 141 which may be provided in the line 59 between the control 54 and the hydraulic motor 48. Such valve 141 may regulate the speed of the conveyor from zero to about 16 feet per minute.

Referring to FIGURE 10, there is illustrated the drive for the rotatable shaft 28. The power takeoff shaft 15 is connected to shaft 32 by a conventional universal joint 142. The shaft 32 is journaled at the front thereof in brace 144 affixed to draft member 18 and at the rear in frame member 146 affixed to wall 24 of container 20 by a transversely disposed angle member 148. Thus, it is seen that power for rotating the arm members 82 within the impeller 26 is provided from the power takeoff shaft of the tractor (which commonly rotates at about 540 revolutions per minute) through the universal 142 to the shaft 32. The end of shaft 32 is operatively connected to the front end of the rotatable shaft 28 by means of a sprocket and chain drive 34. It is seen that when the power takeoff shaft of the tractor is actuated, the rotatable shaft 28 will be driven. If desired, a suitable clutch mechanism may be provided on the container 20 to permit rotation of the power takeoff shaft 15 without driving the rotatable shaft 28.

FIGURES 11 and 12 disclose an attachment 150 for permitting grain or feed to be discharged from the manure spreader into feed bunks. The attachment comprises a box-like chute 152 having at one end thereof a flange 154 adapted to be connected by bolts or the like to a flange 156 on shroud 27. When the attachment is utilized, the impeller will operate in its usual manner and the feed will be discharged through the chute and fall from opening 158 at the end thereof into the feed bunk. The attachment is adapted to be readily attached and removed from the shroud as desired.

The operation of the device will be briefly summarized. The material unloading device 10 is attached to tractor 12 and the power takeoff shaft 15 of tractor 12 is connected to shaft 32 on the material unloading device 10. Lines 56 and 57 are affixed by means of quick disconnect couplings to the hydraulic system of tractor 12. The valve 141 is adjusted for a predetermined rate of unloader travel within the container.

The tractor towing the loaded material unloading device 10 is then driven to the field. To commence spreading material, the power takeoff shaft 15 is actuated to drive longitudinally extending rotatable shaft 28. The arm elements 82 which are swingably or pivotally affixed at one end to the impeller plate 78, cut through the material. Initially, there is a relatively small load imposed upon the shaft 28 for the arm elements nest around the impeller plate. As the speed of rotation of shaft 28 increases (up to a minimum discharging and spreading speed of about 450 revolutions per minute), centrifugal force causes the arms 82 to extend outwardly generally radially from the impeller plate 78.

When it is desired to move impeller 26 within the container, handle 55 is actuated to operate control valve 54. The hydraulic motor 48 will drive the gear reduction unit 52 through the power drive 50, thereby rotating the cross shaft 43. Rotation of shaft 43 will cause movement of the chains 36 and 37. As the chains are driven, the trolley assemblies, including the floating rollers and the carrying rollers, will move the cross arm 29 rearwardly in the container 20. The material is sheared from the face of the load and discharged uniformly and evenly through opening 27a in shroud 27 as the impeller 26 moves rearwardly in the container 20. The arms 82 rotating in the action chamber create a high velocity air discharge through opening 27a. The pressurized air condition in the action chamber assists the flinging action of arms 82 to effect a uniform and broad pattern of distribution of material over the field. It will be noted that the shroud is adapted to discharge material generally horizontally from the container. It will be understood that the direction of discharge may be varied by placing suitable baffles in the shroud opening or by changing the location of the opening in the shroud.

As the impeller approaches the wall 22 of the container, lug 140 on the chain 36 will strike stop 136, actuating lever 130 and repositioning control valve 54. This causes reverse movement of the hydraulic motor 48, thereby reversing movement of the chains 36 and 37 and returning the impeller 26 to its initial starting position adjacent wall 24. As the impeller reaches its initial starting position, lug 140 on chain 36 will engage stop member 137 to reposition control valve 54 to its neutral position and thereby terminate movement of the unloader means 26 within the container.

As aforenoted, the container 20 is preferably liquid-tight and can be readily utilized for liquid manures or the like. In the event that a liquid or slurry material is to be spread onto field, the impeller means may be retained in its starting position adjacent to the front wall 24 of container 20. The control means 55 need not be actuated. Upon starting of the power takeoff shaft 15, the rotatable shaft 28 and the impeller carried thereon will be rotated. The impeller will discharge the slurry or liquid manure from the shroud 27 uniformly as the tractor moves over the field. If desired, the impeller means may be moved rearwardly. However, satisfactory results may be obtained without moving the impeller 26 axially from its initial position when discharging and spreading a slurry or liquid manure. If desired, the entry end of the shroud (opposed and spaced from the plane of the follow board) may be partially closed when liquid is to be discharged from the container to maximize the aerodynamic effect and thereby increase the distribution pattern.

The present invention represents a marked departure in concept from previous material unloading devices. The conveyor or advancing mechanism is itself removed from within the container and thus is not subject to the deleterious effects of the salts, amino acids and other destructive components present in some manures. The unloader means comprises an impeller means that is axially movable along a rotatable shaft within the container, with the impeller operatively connected to the shaft for rotation therewith. The initial power requirement to rotate the impeller is low by comparison to flail-type manure spreaders utilizing a plurality of axially spaced arms along a drive shaft. The impeller arms of this invention function not only to cut or shear the load but also to hurl the same from the container through opening 27a in shroud 27. In addition, the impeller arms 82 rotating within the action chamber create a pressurized air condition in the action chamber for use in propelling the disintergrated or cut load from the action chamber, through the shroud opening, and onto the ground in a uniform pattern.

The new material unloading device will uniformly and evenly spread material of all types, including dry pelletized pesticide or insecticide, dry fertilizer and agricultural limestone, seed, any type of forage (green, wet, or dry), baled material, such as straw, snow and ice, ear corn, and any type of manure including frozen chunks and liquid.

For any given load of material to be unloaded which is of substantially uniform quality throughout, the setting of the apparatus for a pre-selected rate of movement of the unloader along the length of the container results in desirable operation at a substantially uniform rate of discharge and a substantially uniform torque requirement. The present invention is relatively maintenance free and is reliable in operation in all kinds of weather and even at temperatures below freezing.

The present material unloading device can effectively function as a mixer and spreader. Material may be loaded into the container in two or more layers. As the unloader means operates, the impeller will act upon an end or face of the load, cutting through and mixing the separate layers of material in the action chamber, and then discharging the mixed material from the container.

A mechanical drive and control arrangement may be substituted for the hydraulic drive motor 48 and its associated control without departing from the spirit of the present invention.

The above disclosure has been given by way of illustration and elucidation, and not by way of limitation, and it is desired to protect all embodiments of the herein disclosed inventive concept within the scope of the appended claims.

I claim:

1. A material unloading device for discharging material therefrom laterally of the device, said unloading device comprising, in combination, an elongated material container having axially spaced ends and an elongated opening longitudinally thereof and being of substantially uniform internal cross-section along its length, a material unloader carried by said elongated material container and arranged for movement longitudinally thereof, said material unloader including an upright backing wall and rotary material spreading means, said upright backing wall being of substantially similar cross-section as the internal cross-section of the material container, positioned within the material container and extending transversely of the axis of the material container and presenting an operative side positioned to face the material in the container that is to be unloaded, said rotary material spreading means being mounted to rotate in a plane transverse to the longitudinal axis of the material container and spaced from said operative side of the backing wall, and means for moving said material spreading means and backing wall longitudinally of the material container.

2. A material unloading device for discharging material therefrom laterally of the device, said unloading device comprising, in combination, an elongated material container having axially spaced ends and an elongated opening longitudinally thereof and being of substantially uniform internal cross-section along its length, a material unloader carried by said elongated material container and arranged for movement longitudinally thereof, said material unloader including an upright backing wall, rotary material spreading means, and shroud means, said upright backing wall being of substantially similar cross-section as the internal cross-section of the material container, positioned within the material container and extending transversely of the axis of the material container and presenting an operative side positioned to face the material in the container that is to be unloaded, said rotary material spreading means being mounted to rotate in a plane transverse to the longitudinal axis of the material container and spaced from said operative side of the backing wall, means for moving said material spreading means and backing wall longitudinally of the material container, said shroud means being operatively associated with said backing wall and defining an action chamber which partially surrounds and defines the region in which the rotary material spreading means is caused to be rotated, and there being an opening defined by said shroud means, in the plane of movement of said rotary material spreading means, which serves as a discharge opening for the material being discharged.

3. A device as set forth in claim 2 wherein said shroud means includes an upright wall substantially aligned with the upright backing wall, and a curved peripheral wall cooperating with said upright wall to provide a confined space in which air is pressurized by movement of the rotary material spreading means to produce an aerodynamic assist in the discharging and scattering of the material.

4. A device as set forth in claim 2 wherein said shroud means includes an upright wall substantially aligned with the upright backing wall, a curved peripheral wall cooperating with said upright wall to provide a confined space in which air is pressurized by movement of the rotary material spreading means to produce an aerodynamic assist in the discharging and scattering of the material, and the axial length of the curved peripheral wall being such as to project from the upright wall through and beyond the plane in which the rotary material spreading means is caused to be rotated.

5. A device as set forth in claim 2 wherein said shroud means includes an upright wall substantially aligned with the upright backing wall, a curved peripheral wall cooperating with said upright wall to provide a confined space in which air is pressurized by movement of the rotary material spreading means to produce an aerodynamic assist in the discharging and scattering of the material, and means carried by said upright backing wall for effecting a seal with the wall of the material container.

6. A material unloading device for discharging material therefrom laterally of the device, said unloading device comprising, in combination, an elongated material container having axially spaced ends and an elongated opening longitudinally thereof and being of substantially uniform internal cross-section along its length, a material unloader carried by said elongated material container and arranged for movement longitudinally thereof, said material unloader including an upright backing wall and rotary material spreading means, said upright backing wall being of substantially similar cross-section as the internal cross-section of the material container, positioned within the material container and extending transversely of the axis of the material container and presenting an operative side positioned to face the material in the container that is to be unloaded, said rotary material spreading means being mounted to rotate in a plane transverse to the longitudinal axis of the material container and spaced from said operative side of the backing wall, means for moving said material spreading means and backing wall longitudinally of the material container, and means carried by said upright backing wall for effecting a sliding seal with the wall of the material container.

7. A device as set forth in claim 6 wherein said seal is positioned between the peripheral edge of the backing wall and the inner walls of the material container.

8. A material unloading device for discharging material therefrom laterally of the device, said unloading device comprising, in combination, an elongated material container having axially spaced ends and an elongated opening longitudinally thereof and being of substantially uniform internal cross-section along its length, a material unloader carried by said elongated material container and arranged for movement longitudinally thereof, said material unloader including an upright backing wall, of substantially similar cross-section as the internal cross-section of the material container, positioned within the material container and extending transversely of the axis of the material container and presenting an operative side positioned to face the material in the container that is to be unloaded, rotary material spreading means mounted to rotate in a plane transverse to the longitudinal axis of the material container and spaced from said operative side of the backing wall, means for moving said material spreading means and backing wall longitudinally of the material container, an elongated rotatable drive shaft extending axially of said elongated material container, said backing wall and rotary material spreading means being mounted on said drive shaft for simultaneous sliding movement on said shaft longitudinally of the material container, and means drivingly coupling said drive shaft to said material spreading means to cause same to rotate in unison.

9. A material unloading device for discharging material therefrom laterally of the device, said unloading device comprising, in combination, an elongated material container having axially spaced ends and an elongated opening longitudinally thereof and being of substantially uniform internal cross-section along its length, a material unloader carried by said elongated material container and arranged for movement longitudinally thereof, said material unloader including an upright backing wall and rotary material spreading means, said upright backing wall being of substantially similar cross-section as the internal cross-section of the material container, positioned within the material container and extending transversely of the axis of the material container and presenting an operative side positioned to face the material in the container that is to be unloaded, said rotary material spreading means being mounted to rotate in a plane transverse to the longitudinal axis of the material container and spaced from said operative side of the backing wall, means for moving said material spreading means and backing wall longitudinally of the material container, said latter means including spaced elongated rail means extending longitudinally of the material container and positioned exteriorly of said container, an elongated cross member extending transversely of said container and being operatively associated with the other side of said upright backing wall to cause the cross member and backing wall to move in unison longitudinally of the container, and the ends of said cross member carrying roller means located on opposite sides of the plane of said backing wall and being operatively associated with said rail means for guiding movement of the cross member therealong.

10. A device as in claim 9 wherein each of said rail means defines spaced parallel elements, and the roller means including pairs of rollers each smaller than the spacing of said parallel elements and being located between the parallel elements and arranged to rollingly engage each other and to force individual rollers respectively against respective ones of said parallel elements, and one of each pair of rollers being connected to a drive element that serves as part of the said means for moving said material spreading means longitudinally of the material container.

11. An improved material shredder-and-distributor for use in a material unloading container of the type where the shredder and distributor is rotatable in a planar zone that is transverse to the longitudinal axis of the container and is of relatively short axial extent so that said shredder-and-distributor may be operated along substantially the entire interior length of the container, said shredder-and-distributor comprising, in combination, a rotatable hub at one axial end of said planar zone, means fixed on the hub to one side thereof and including at least one elongated arcuately shaped blade that lies in the planar zone and extends generally radially of the hub from adjacent the center of the hub to its outer terminus adjacent the outer periphery of the hub for shredding material and for advancing said shredded material generally radially outwardly of the hub, a plurality of rigid arms pivotally connected to said hub adjacent the outer periphery of the hub and within the same planar zone as said arcuately shaped blade for shredding material located radially outwardly of the hub and for providing a discharging impetus to fragments of shredded material to effect discharge from the material container, and one of said pivotally mounted arms being located immediately adjacent the outer terminus of each said arcuately shaped blade to receive therefrom the material that is moved outwardly by said arcuately shaped blade.

12. A device as set forth in claim 11 wherein at least one of said rigid arms carries a plurality of cutting blades thereon located at spaced radial positions along said arm, and at least one other of said rigid arms carries a cutting blade thereon located radially thereon at a point to cut in the area defined by the said spacing of the plurality of blades on the first said arm.

13. A device as set forth in claim 11 wherein the rigid arms are shaped at their outermost ends to define an abruptly inclined tip that projects forwardly relative to the direction of rotation of the hub and arms, so as to assist in the discharge of cut material by the shredder-and-distributor.

14. A device as set forth in claim 11 wherein the rigid arms each carry attached thereto at least one cutting blade where the cutting edge of the blade is so shaped and arranged that it extends outwardly from the arm a different distance progressively along the length of the blade's attachment to the arm.

References Cited by the Examiner
UNITED STATES PATENTS

| 895,358 | 8/1908 | Fokken | 275—3 |
| 2,296,474 | 9/1942 | Kucera | 275—6 |

(Other references on following page)

| | | UNITED STATES PATENTS | |
|---|---|---|---|
| 2,553,455 | 5/1951 | Higby | 275—8 |
| 2,626,809 | 1/1953 | Fergason | 275—6 X |
| 2,672,718 | 3/1954 | Thomas | 172—45 |
| 2,777,268 | 1/1957 | Breed | 172—45 X |
| 3,105,693 | 10/1963 | Farris | 275—3 |

FOREIGN PATENTS 1,249,463  11/1960  France.

ABRAHAM G. STONE, *Primary Examiner.*

WILLIAM A. SMITH, *Examiner.*